(12) United States Patent
Bersak

(10) Patent No.: US 12,511,508 B2
(45) Date of Patent: Dec. 30, 2025

(54) SCANNING OPTICAL CODES WITH IMPROVED ENERGY EFFICIENCY

(71) Applicant: Walmart Apollo, LLC, Bentonville, AR (US)

(72) Inventor: Daniel Ryan Bersak, Astoria, NY (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/883,093

(22) Filed: Sep. 12, 2024

(65) Prior Publication Data

US 2025/0131221 A1    Apr. 24, 2025

Related U.S. Application Data

(60) Provisional application No. 63/591,660, filed on Oct. 19, 2023.

(51) Int. Cl.
| | |
|---|---|
| *G06K 7/14* | (2006.01) |
| *G06T 3/40* | (2024.01) |
| *H04N 23/63* | (2023.01) |

(52) U.S. Cl.
CPC ......... *G06K 7/1443* (2013.01); *G06K 7/1413* (2013.01); *G06K 7/1417* (2013.01); *G06T 3/40* (2013.01); *H04N 23/63* (2023.01)

(58) Field of Classification Search
CPC ........ H04N 23/63; G06T 3/40; G06K 7/1417; G06K 7/1443
See application file for complete search history.

(56) References Cited

U.S. PATENT DOCUMENTS

| | | | |
|---|---|---|---|
| 6,366,771 B1 | 4/2002 | Angle et al. | |
| 8,704,939 B1 * | 4/2014 | Cho | H04N 23/675 |
| | | | 348/333.02 |
| 8,943,036 B1 * | 1/2015 | Coudron | G06F 16/2428 |
| | | | 707/706 |
| 9,721,535 B2 | 8/2017 | Chen et al. | |
| 9,830,488 B2 * | 11/2017 | Todeschini | G06K 7/1439 |
| 9,892,668 B2 * | 2/2018 | Wadhwa | G09G 3/20 |
| 10,069,984 B2 * | 9/2018 | Cho | H04N 1/32144 |
| 10,510,063 B2 * | 12/2019 | Jeon | G06Q 20/227 |
| 10,963,658 B1 | 3/2021 | Bloch et al. | |
| 11,856,305 B2 * | 12/2023 | Mandelli | G06V 20/52 |
| 12,175,326 B2 * | 12/2024 | Li | G06F 1/3265 |
| 12,175,327 B1 * | 12/2024 | Biasini | G06F 1/1605 |
| 2009/0212113 A1 * | 8/2009 | Chiu | G06K 7/1417 |
| | | | 235/462.41 |

(Continued)

FOREIGN PATENT DOCUMENTS

JP    2003222893 A    8/2003

*Primary Examiner* — Daniel I Walsh
(74) *Attorney, Agent, or Firm* — Jones Day

(57) ABSTRACT

Systems and methods for scanning optical codes with improved energy efficiency are disclosed. In some embodiments, a disclosed method includes: obtaining a video captured by a camera; determining, based on a machine learning model, whether an optical code is included in any frame image of the video; presenting a viewable area on a display operatively coupled to the camera, once the video starts to include at least a portion of the optical code; and dynamically adjusting the viewable area based on a size of the optical code in each frame image of the video.

20 Claims, 14 Drawing Sheets

(56) References Cited

U.S. PATENT DOCUMENTS

| | | | | |
|---|---|---|---|---|
| 2010/0045800 | A1* | 2/2010 | Chebil | G06T 7/20 |
| | | | | 348/169 |
| 2012/0173347 | A1* | 7/2012 | De Almeida Neves | |
| | | | | G06K 7/10861 |
| | | | | 705/16 |
| 2013/0080887 | A1* | 3/2013 | Hou | G06F 40/137 |
| | | | | 715/273 |
| 2015/0278572 | A1* | 10/2015 | Asukai | G06K 7/1456 |
| | | | | 235/454 |
| 2017/0337407 | A1* | 11/2017 | Chang | G06K 19/06112 |
| 2017/0337456 | A1* | 11/2017 | Chang | G09G 3/3208 |
| 2018/0034979 | A1* | 2/2018 | Aggarwal | H04N 1/00251 |
| 2019/0197276 | A1* | 6/2019 | Wu | G06K 7/1447 |
| 2019/0370779 | A1* | 12/2019 | Lee | G06K 7/1413 |
| 2023/0138677 | A1* | 5/2023 | Kwong | G06T 13/40 |
| | | | | 345/473 |
| 2023/0187815 | A1* | 6/2023 | Miau | H01Q 1/2283 |
| | | | | 343/702 |
| 2024/0211880 | A1* | 6/2024 | Johnson | H04W 4/029 |
| 2024/0276228 | A1* | 8/2024 | Zhou | H04L 9/0869 |
| 2024/0330636 | A1* | 10/2024 | Nakayama | G06K 7/1095 |
| 2025/0131221 | A1* | 4/2025 | Bersak | H04N 23/63 |
| 2025/0218317 | A1* | 7/2025 | Chang | G06T 5/80 |

* cited by examiner 700-2

SCANNING OPTICAL CODES WITH IMPROVED ENERGY EFFICIENCY

CROSS-REFERENCE TO RELATED APPLICATION

This application claims benefit to U.S. Provisional Application Ser. No. 63/591,660, entitled "SYSTEMS AND METHODS FOR SCANNING OPTICAL CODES WITH IMPROVED ENERGY EFFICIENCY," filed on Oct. 19, 2023, the disclosure of which is incorporated herein by reference in its entirety.

TECHNICAL FIELD

This application relates generally to scanning codes and, more particularly, to systems and methods for scanning optical codes with improved energy efficiency.

BACKGROUND

Machine-readable optical codes, e.g. barcodes, quick-response (QR) codes, have been widely used in retail environment, transactional process, and many other industries. While optical codes are traditionally scanned using a specialized laser-based scanner, mobile devices (e.g., smartphones and tablets) with cameras and display screens have become popular to scan optical codes by acquiring an image of a code and using image analysis to decode the code.

Nowadays, more and more items need to be organized or arranged every day in the inventory and/or stores, to satisfy fulfillment and in-store purchase or pick-up requirements. Almost every item arrangement involves code scanning. As such, associates working in an inventory or store would use code scanning apps all day long, and tend to see reduced battery life on their mobile devices. Some associates are even forced to carry external battery chargers in order to make the mobile device work through a whole shift of scanning. Therefore, it is desirable to optimize battery life of a mobile device, while still maintaining its ability to scan optical codes.

BRIEF DESCRIPTION OF THE DRAWINGS

The features and advantages of the present disclosure will be more fully disclosed in, or rendered obvious by the following detailed description of the example embodiments, which are to be considered together with the accompanying drawings wherein like numbers refer to like parts and further wherein.

DETAILED DESCRIPTION

Figure 1:
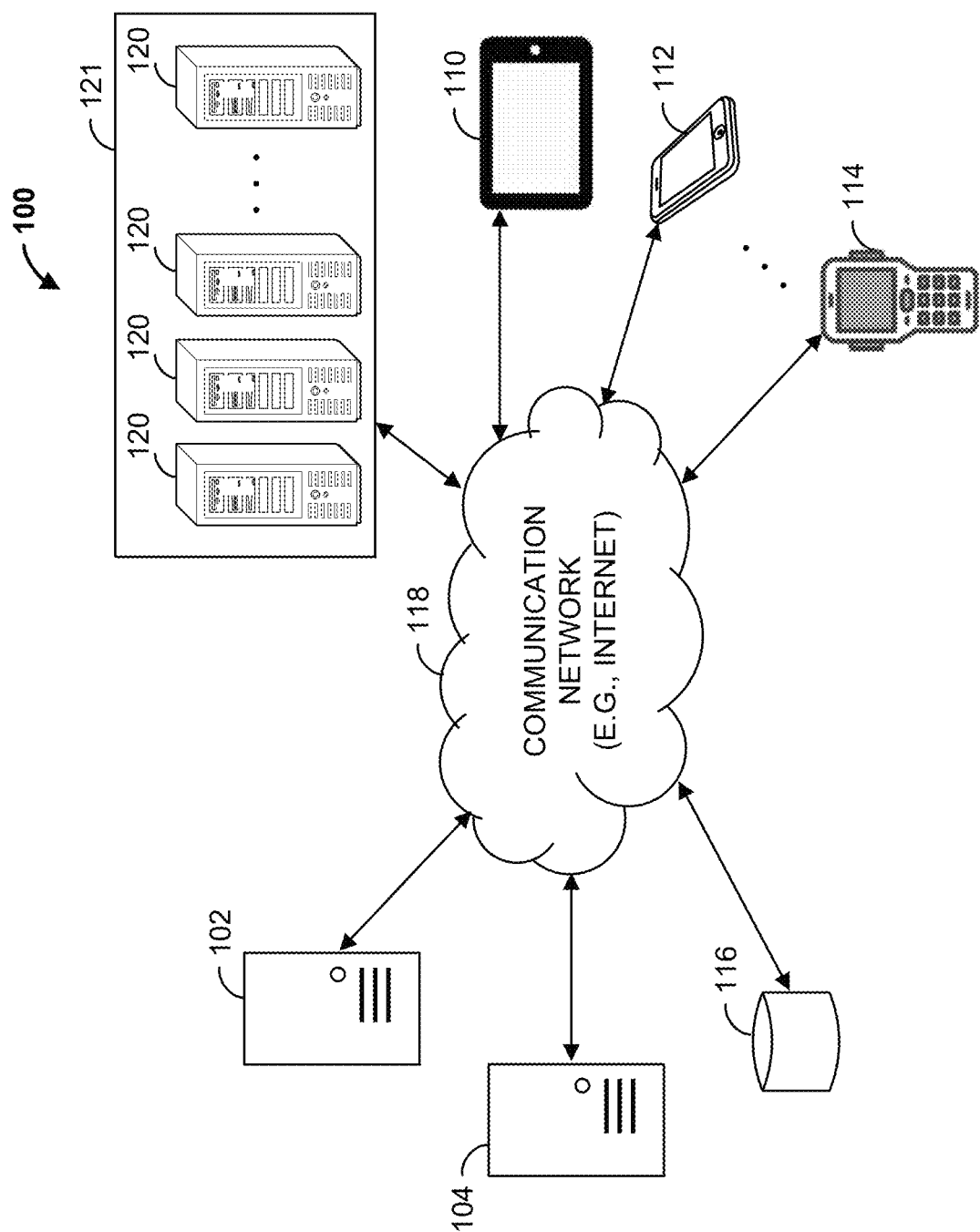
FIG. 1 is a network environment configured to scan optical codes with improved energy efficiency, in accordance with some embodiments of the present teaching.

This description of the example embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Scanning optical codes (e.g. barcodes, QR codes) is an energy consuming process for a code scanner, especially when the code scanner displays the camera view during the code scanning. The present teaching discloses systems and methods to scan optical codes with improved energy efficiency, by dynamically adjusting a size of a viewable area in a display of the code scanner. While a barcode will be used in the following descriptions regarding code scanning, it can be understood that the same methods and systems can be applied for scanning any optical code.

In various embodiments, a system including a camera, a display operatively coupled to the camera, a processor operatively coupled to the camera and the display, and a non-transitory memory storing instructions is disclosed. The instructions, when executed, cause the processor to: obtain a video captured by the camera; determine, based on a machine learning model, whether an optical code is included in any frame image of the video; present a viewable area on the display once the video starts to include at least a portion of the optical code; and dynamically adjust the viewable area based on a size of the optical code in each frame image of the video.

In various embodiments, a computer-implemented method is disclosed. The computer-implemented method includes: obtaining a video captured by a camera; determining, based on a machine learning model, whether an optical code is included in any frame image of the video; presenting a viewable area on a display operatively coupled to the camera, once the video starts to include at least a portion of the optical code; and dynamically adjusting the viewable area based on a size of the optical code in each frame image of the video.

In various embodiments, a non-transitory computer readable medium having instructions stored thereon is disclosed. The instructions, when executed by at least one processor, cause at least one device to perform operations including: obtaining a video captured by a camera; determining, based on a machine learning model, whether an optical code is included in any frame image of the video; presenting a viewable area on a display operatively coupled to the camera, once the video starts to include at least a portion of the optical code; and dynamically adjusting the viewable area based on a size of the optical code in each frame image of the video.

For a mobile device scanning a barcode, one of the biggest battery draining factors is its display screen. But in general, it is preferred not to turn the screen completely off during barcode scanning, because a displayed barcode can be used for scanning calibration and/or confirmation. Accordingly, systems in some embodiments of the present teaching deactivate or dim some non-barcode pixels on the display, to reduce energy consumption. This could be accomplished in a number of manners.

In some embodiments, a disclosed system determines or specifies a viewable area, e.g. a rectangle window, in the display of a mobile device for scanning a barcode. As such, a user of the mobile device is supposed to place the barcode to be scanned in the specified viewable area. All pixels outside the viewable area can be either dimmed or disabled.

In some embodiments, a disclosed system uses a machine learning model or an artificial intelligence (AI) model to locate and track all barcodes in the frame images of the scanning video captured by a camera of the mobile device. Accordingly, a size of the viewable area on the display of the mobile device can be dynamically adjusted based on whether there is barcode within a camera view and the size and location of the barcode in the camera view. Pixels outside the barcode can be either dimmed or disabled.

In some embodiments, the size of the viewable area could be zero, i.e. the screen is turned off or all black, when a code scanning app is running on the mobile device for scanning barcodes but no barcode is detected (e.g. when the camera is facing floor, ceiling or anywhere without a barcode). The size of the viewable area is enlarged as some portion of a barcode is detected. Then the size of the viewable area is reduced or enlarged to fit the barcode size in the camera view, after detecting the entire barcode, while the pixels outside the viewable area may be either turned off or dimmed.

In some embodiments, the entire live view of the camera is displayed in a viewable area, as a subset of the display screen. That is, whatever included in the camera view, e.g. including the barcode and all other content around the barcode, is displayed together in the viewable area which has a reduced size compared to the entire display screen. All pixels outside the viewable area can be either dimmed or disabled. By disabling or dimming non-barcode areas of the display screen, the battery life of the mobile device can be extended dramatically for a user scanning barcodes all day long.

Furthermore, in the following, various embodiments are described with respect to systems and methods for scanning optical codes with improved energy efficiency are disclosed. In some embodiments, a disclosed method includes: obtaining a video captured by a camera; determining, based on a machine learning model, whether an optical code is included in any frame image of the video; presenting a viewable area on a display operatively coupled to the camera, once the video starts to include at least a portion of the optical code; and dynamically adjusting a size of the viewable area based on a size of the optical code in each frame image of the video.

Turning to the drawings, FIG. 1 is a network environment 100 configured to scan optical codes with improved energy efficiency, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a display computing device 102, a server 104 (e.g., a web server or an application server), a cloud-based engine 121 including one or more processing devices 120, a database 116, and one or more code scanning devices 110, 112, 114 operatively coupled over the network 118. The display computing device 102, the server 104, the workstation(s) 106, the processing device(s) 120, and the multiple code scanning devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the display computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the display computing device 102.

In some examples, each of the multiple code scanning devices 110, 112, 114 can be a cellular phone, a smart phone, a tablet, a personal assistant device, a voice assistant device, a digital assistant, a laptop, a computer, a laser-based code scanner, or any other suitable device that can scan optical codes. In some examples, the server 104 hosts an app or software that delivers an application through a communication protocol to provide code scanning services. In some examples, the display computing device 102, the processing devices 120, and/or the server 104 are operated by a retailer or an inventory management service. The multiple code scanning devices 110, 112, 114 may be operated by associates and/or customers in stores and fulfillment centers associated with the retailer. In some examples, the processing devices 120 are operated by a third party (e.g., a cloud-computing provider).

Although FIG. 1 illustrates three code scanning devices 110, 112, 114, the network environment 100 can include any number of code scanning devices 110, 112, 114. Similarly, the network environment 100 can include any number of the display computing devices 102, the processing devices 120, the servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first code scanning device 110, the second code scanning device 112, and the Nth code scanning device 114 may communicate with the server 104 over the communication network 118. For example, each of the code scanning devices 110, 112, 114 may be operable to view, access, and interact with an app, e.g. a code scanning app hosted by the server 104. The server 104 may transmit data related to a user's code scanning activity on the app to the display computing device 102.

In some examples, a user (e.g. an associate or a customer) may operate one of the code scanning devices 110, 112, 114 to log into an app served by the server 104, for scanning barcodes on items. The barcode scanning may be performed to: check inventory level of the items, check price or other information of the items, re-arranging the items, stocking items to or unstocking items from shelves, item placement or re-placement on shelves, packing the items for pick-up, loading the items during check-in, or selling the items during check-out. The app may activate a camera on the code scanning device, such that the user can use the camera to scan a barcode on an item. During the barcode scanning, the display screen on the code scanning device may not display the entire camera view and may not display all the time. Parameters for the displaying during the barcode scanning on the code scanning device may be obtained from the display computing device 102, directly or through the server 104.

In some embodiments, the display computing device 102 may obtain, e.g. via the server 104 or a database associated with the server 104, historical display data of the code scanning devices 110, 112, 114 during their barcode scanning process. In addition, the display computing device 102 can obtain, e.g. via the server 104 or a database associated with the server 104, historical battery consumption data, historical barcode scanning performance data, and related metadata of the code scanning devices 110, 112, 114 during their barcode scanning process. Based on the obtained historical data, the display computing device 102 may determine or compute optimal parameters for displaying a barcode during the barcode scanning process, to minimize battery consumption while keeping the barcode scanning accuracy for the code scanning devices 110, 112, 114. The display computing device 102 can transmit these optimal parameters to the code scanning devices 110, 112, 114, directly or through the server 104, for displaying barcodes in future barcode scanning at the code scanning devices 110, 112, 114.

Each of the display computing device 102, the server 104 and the code scanning devices 110, 112, 114 is operable to communicate with the database 116 over the communication network 118, and can store data to and read data from the database 116. For example, the server 104 can store historical data of the barcode scanning app to the database 116; the display computing device 102 can read these historical data stored in the database 116. In addition, the display computing device 102 can store computed parameters into the database 116; and the code scanning devices 110, 112, 114 can read these computed parameters stored in the database 116. The database 116 can be a remote storage device, such as a cloud-based server, a disk (e.g., a hard disk), a memory device on another application server, a networked computer, or any other suitable remote storage. Although shown remote to the display computing device 102, the server 104 and the code scanning devices 110, 112, 114, in some examples, the database 116 can be a local storage device, such as a hard drive, a non-volatile memory, or a USB stick of the display computing device 102, the server 104 or any of the code scanning devices 110, 112, 114.

In some examples, the display computing device 102 may execute one or more models (e.g., algorithms), such as a machine learning model, deep learning model, statistical model, etc., to improve energy efficiency during barcode scanning. For example, the display computing device 102 may compute the optimal display parameters based on a machine learning model. In some embodiments, the display computing device 102 can generate a machine learning model to determine whether an image includes a barcode or a portion of a barcode, and determine the size and location of the barcode. In general, the display computing device 102 can help any of the code scanning devices 110, 112, 114 to run a computing task used for the barcode scanning app. When the computing task is complicated, the display computing device 102 may execute a machine learning model or an AI model.

In some examples, the display computing device 102 generates training data for a plurality of models (e.g., machine learning models, deep learning models, statistical models, algorithms, etc.). The display computing device 102 trains the models based on training data, and stores the models in a database, such as in the database 116 (e.g., a cloud storage). In some embodiments, the display computing device 102 may perform model training upon a request from the server 104. In some embodiments, the display computing device 102 may perform model training automatically or periodically based on a pre-configuration. The training data may include historical data of the barcode scanning app as well as user feedbacks from the code scanning devices 110, 112, 114. In some embodiments, the training data includes many synthetic data generated from random scenes by the display computing device 102 itself. Those random scenes can mimic real barcode scanning scenarios, such that computer-generated labels (alone or in combination with human-generated labels) can be used for training a machine learning model.

The models, when executed by the display computing device 102, allow the display computing device 102 to provide optimal parameters to the code scanning devices 110, 112, 114 for displaying barcodes in an energy efficient manner during barcode scanning. In some examples, the display computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the display computing device 102 may compute the optimal parameters and/or finish other computing tasks efficiently.

Figure 2:
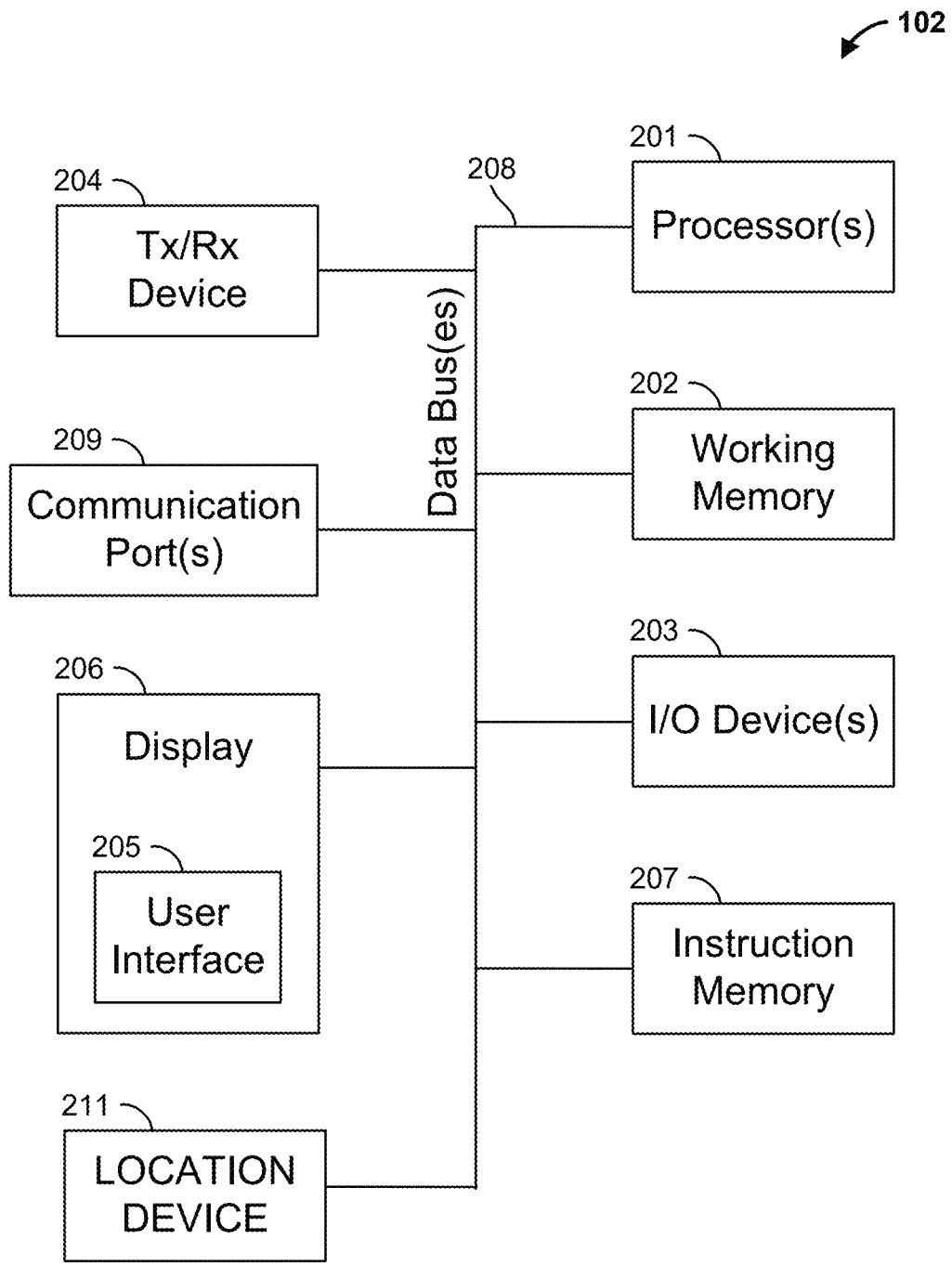
FIG. 2 is a block diagram of a display computing device, in accordance with some embodiments of the present teaching.

FIG. 2 illustrates a block diagram of a display computing device, e.g. the display computing device 102 of FIG. 1, in accordance with some embodiments of the present teaching. In some embodiments, each of the display computing device 102, the server 104, the multiple code scanning devices 110, 112, 114, and the one or more processing devices 120 in FIG. 1 may include the features shown in FIG. 2. Although FIG.

2 is described with respect to certain components shown therein, it will be appreciated that the elements of the display computing device 102 can be combined, omitted, and/or replicated. In addition, it will be appreciated that additional elements other than those illustrated in FIG. 2 can be added to the display computing device 102.

As shown in FIG. 2, the display computing device 102 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses 208. The data buses 208 allow for communication among the various components. The data buses 208 can include wired, or wireless, communication channels.

The one or more processors 201 can include any processing circuitry operable to control operations of the display computing device 102. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can be configured to perform a certain function or operation by executing code, stored on the instruction memory 207, embodying the function or operation. For example, the one or more processors 201 can be configured to execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 207 and working memory 202, it will be appreciated that the display computing device 102 can include a single memory unit configured to operate as both instruction memory and working memory. Further, although embodiments are discussed herein including non-volatile memory, it will be appreciated that the display computing device 102 can include volatile memory components in addition to at least one non-volatile memory component.

In some embodiments, the instruction memory 207 and/or the working memory 202 includes an instruction set, in the form of a file for executing various methods, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 201.

The input-output devices 203 can include any suitable device that allows for data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 allow for communication with a network, such as the communication network 118 of FIG. 1. For example, if the communication network 118 of FIG. 1 is a cellular network, the transceiver 204 is configured to allow communications with the cellular network. In some embodiments, the transceiver 204 is selected based on the type of the communication network 118 the display computing device 102 will be operating in. The one or more processors 201 are operable to receive data from, or send data to, a network, such as the communication network 118 of FIG. 1, via the transceiver 204.

The communication port(s) 209 may include any suitable hardware, software, and/or combination of hardware and software that is capable of coupling the display computing device 102 to one or more networks and/or additional devices. The communication port(s) 209 can be arranged to operate with any suitable technique for controlling information signals using a desired set of communications protocols, services, or operating procedures. The communication port (s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 allows for the programming of executable instructions in the instruction memory 207. In some embodiments, the communication port(s) 209 allow for the transfer (e.g., uploading or downloading) of data, such as machine learning model training data.

In some embodiments, the communication port(s) 209 are configured to couple the display computing device 102 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1xRTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the display computing device 102 and/or the server 104. For example, the user interface 205 can be a user interface for an application of a network environment operator that allows a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device configured to receive position data identifying a latitude and longitude from one or more satellites of a GPS constellation. As another example, in some embodiments, the location device 211 is a cellular device configured to receive location data from one or more localized cellular towers. Based on the position data, the display computing device 102 may determine a local geographical area (e.g., town, city, state, etc.) of its position.

In some embodiments, the display computing device 102 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multi-threading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
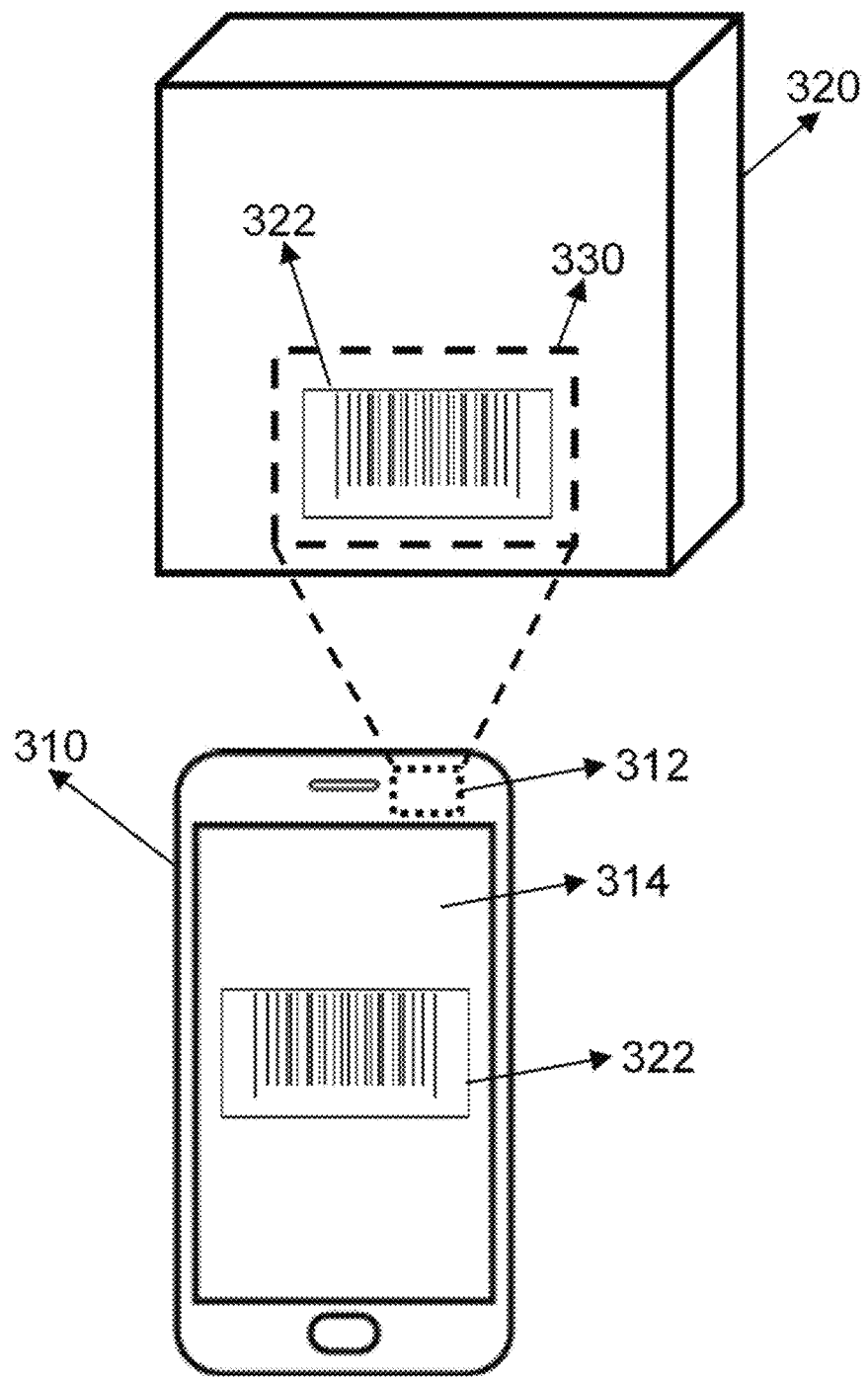
FIG. 3 illustrates a scanning device scanning an optical code on an item, in accordance with some embodiments of the present teaching.

FIG. 3 illustrates a scanning device 310 scanning an optical code (e.g. a barcode) on an item, in accordance with some embodiments of the present teaching. In some embodiments, the scanning device 310 may be implemented as any one of the code scanning devices 110, 112, 114 in FIG. 1.

In the example shown in FIG. 3, the scanning device 310 is a mobile device running a code scanning app. The code scanning app activates a camera 312 for scanning a barcode 322 on an item 320. This scanning can be performed for: checking information about the item 320 at an inventory or store, re-arranging or re-placement of the item 320 at an inventory or store, packing or loading the item 320 at an inventory or store, or purchasing the item 320 from a retailer. In some embodiments, the item 320 itself may be a shelf, a lane, or an inventory room stocking other items. In some embodiments, the barcode 322 on the item 320 may identify a payment method, a user account, or any other information related to the item 320 in a retail or inventory management environment.

As shown in FIG. 3, the scanning device 310 scans the barcode 322 using the camera 312 according to a camera view 330. The camera view 330 is a range of an entire scene from a viewpoint of the camera 312, i.e. whatever is seen by the camera 312. In the example shown in FIG. 3, as the camera view 330 covers the barcode 322 on the item 320, the camera 312 captures an image of the barcode 322, which is displayed on a display 314 of the scanning device 310. The display 314 is a screen having a maximal display size. But the display 314 does not have to display the image of the barcode 322 using the maximal display size. That is, the display 314 can display the image of the barcode 322 using a portion of the pixels on the display 314, leaving the other pixels deactivated or dimmed. This will save battery life of the scanning device 310 and reduce energy consumption.

In various embodiments of the present teaching, the scanning device 310 can determine: whether an image captured by the camera 312 includes a barcode or a portion of a barcode, the size and location of the barcode in the image, whether there is any other information related to the item 320 in the image. In various embodiments of the present teaching, each of the above determinations can be performed by a processor at the scanning device 310, and/or based on a machine learning model generated by the display computing device 102. Based on at least one of the above determinations, the scanning device 310 can determine parameters for displaying the barcode 322 on the display 314, according to one or more models generated by the display computing device 102 or the scanning device 310 itself. The one or more models may be stored at the database 116 or locally at the scanning device 310.

In various embodiments of the present teaching, the camera 312 can be located at any location of the scanning device 310, e.g. the back side of the scanning device 310, or the top side of the scanning device 310. In various embodiments of the present teaching, the camera 312 can be replaced by any scanning module that is capable of receiving identification information from the barcode 322 on the item 320, and converting the identification information into a format that the scanning device 310 can read, such as digital data. In various embodiments of the present teaching, the barcode 322 can be replaced by any optical code or image that carries identification information.

In various embodiments of the present teaching, the scanning device 310 also includes a communication device capable of sending and receiving information with other systems, e.g. the display computing device 102, the server 104. For example, the communication device is capable of wirelessly transmitting signals to the display computing device 102 and the server 104, using a radio transmitter and a radio receiver connected with an antenna. The communication device can also receive code scanning app information from the server 104, and code scanning model information from the display computing device 102.

FIGS. 4A-4D illustrate a process 400 for scanning a barcode with improved energy efficiency, in accordance with some embodiments of the present teaching. In some embodiments, the process 400 is performed by a mobile device 410, which may be implemented as any one of the code scanning devices 110, 112, 114 in FIG. 1 or the scanning device 310 in FIG. 3.

Figure 4A:
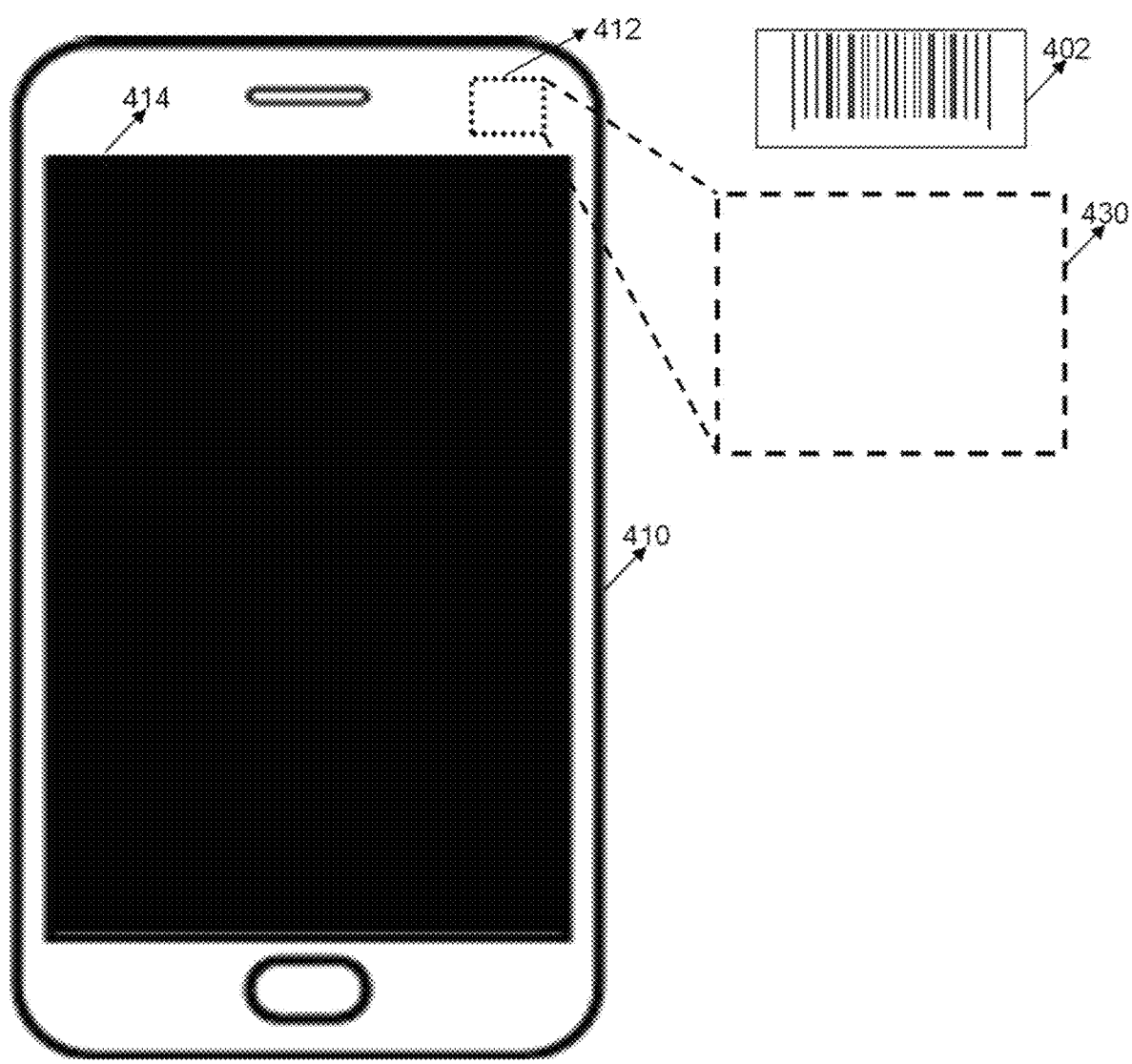
FIGS. 4A-4D illustrate a process for scanning a barcode with improved energy efficiency, in accordance with some embodiments of the present teaching.

At step 400-1 shown in FIG. 4A, the mobile device 410 is running a code scanning app, e.g. after a user opens the app on the mobile device 410 and selects a code scanning function. The app has activated a camera 412 of the mobile device 410 for scanning barcodes in a camera view 430, since the user selects the code scanning function.

At the step 400-1, the camera view 430 of the camera 412 does not include any barcode. This may be because the camera 412 is still facing something other than a barcode, e.g. a floor or a ceiling, right after the user selects the code scanning function. As shown in FIG. 4A, a barcode 402 to be scanned has not been captured by the camera 412 in the camera view 430 yet. Accordingly, a display 414 of the mobile device 410 is totally deactivated in this example, to save energy. In some embodiments, the display 414 of the mobile device 410 is dimmed to have a brightness level lower than a predetermined threshold.

Figure 4B:
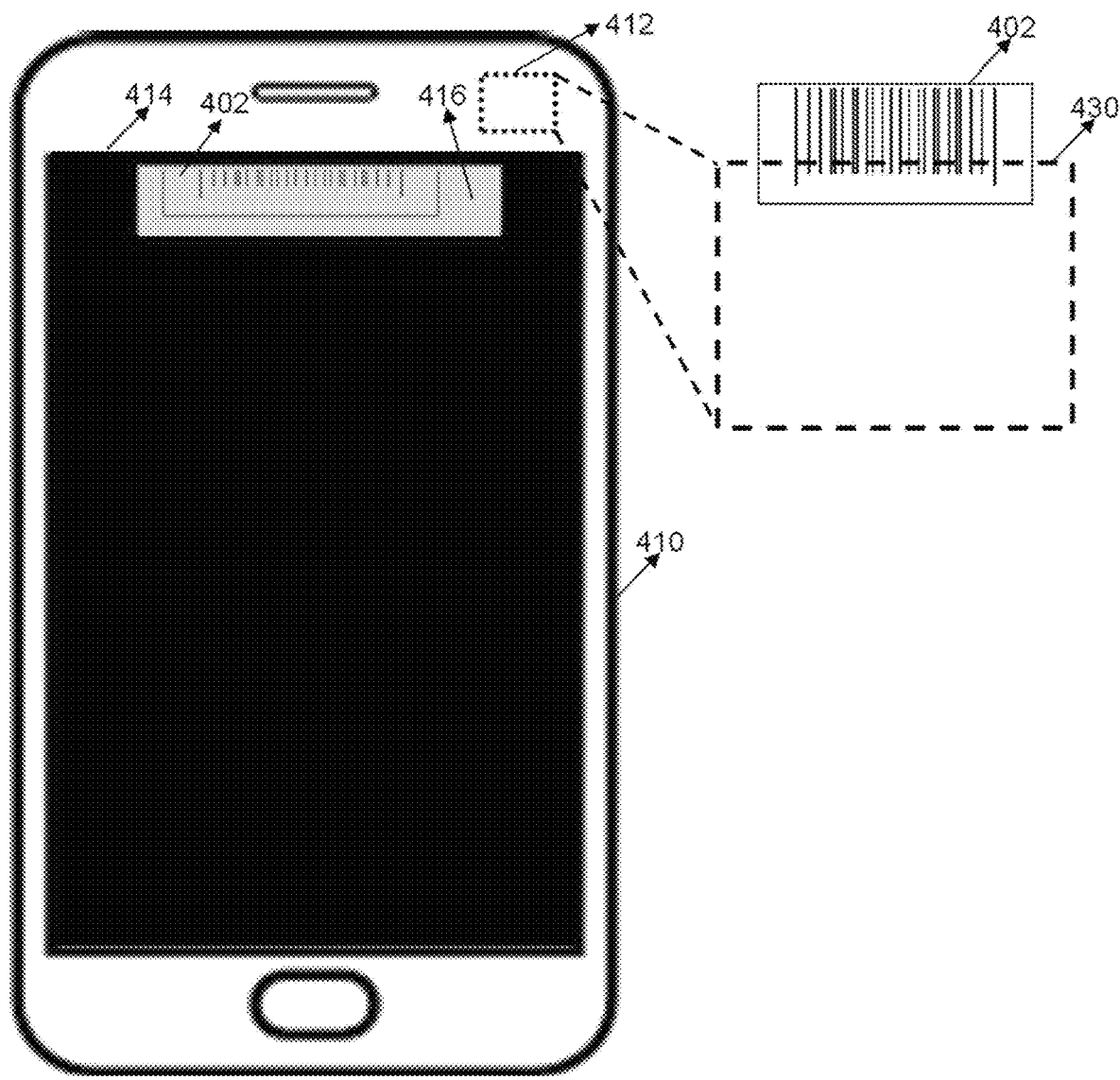

At step 400-2 shown in FIG. 4B, the user has started to move or rotate the mobile device 410 to focus the camera 412 onto the barcode 402. As shown in FIG. 4B, the camera view 430 of the camera 412 starts to include a portion of the barcode 402. That is, as the camera 412 captures a video including a series of frame images to scan barcode, the video starts to include a portion of the barcode 402 in the frame image shown in the camera view 430 of FIG. 4B. At this point, the mobile device 410 can detect the portion of the barcode 402 in the camera view 430. Accordingly, the display 414 of the mobile device 410 starts to present a viewable area 416 on the display 414. In the example shown in FIG. 4B, the viewable area 416 includes the captured portion of the barcode 402 and is presented in a dimmed version. That is, since an entirety of the barcode 402 has not been captured yet, the viewable area 416 has a brightness level lower than a predetermined threshold. In some embodiments, the viewable area 416 is presented with full or normal brightness level (not dimmed), once a portion of the barcode 402 is captured. In this example, the remaining area other than the viewable area 416 in the display 414 is deactivated and does not present anything.

In some embodiments, various parameters of the viewable area 416, e.g. size, dimension, location, dimming level, margin space outside the barcode 402, etc., can be determined by the mobile device 410, based on a model generated by the mobile device 410 itself or the display computing device 102. In some embodiments, the model is a machine learning model or an AI model pre-trained based on historical code scanning data, by the mobile device 410 itself or the display computing device 102. In some embodiments, at least one of the above parameters of the viewable area 416 is dynamically adjusted based on parameters of the barcode 402 in the camera view 430, e.g. size, dimension, and/or location of the barcode 402 in the camera view 430. The dynamic adjusting can be performed based on a machine learning model or an AI model generated by the mobile device 410 itself or the display computing device 102.

In some embodiments, the display computing device 102 generates a machine learning model and stores it in the database 116 or sends it to the mobile device 410; and the mobile device 410 will determine and adjust parameters of the viewable area 416 based on the machine learning model. In some embodiments, the display computing device 102 generates a machine learning model, receives real-time code scanning data from the mobile device 410, and computes the parameters for the mobile device 410 to present the viewable area 416 in real-time. In some embodiments, the mobile device 410 itself generates a machine learning model, and determine and adjust parameters of the viewable area 416 based on the machine learning model.

Figure 4C:
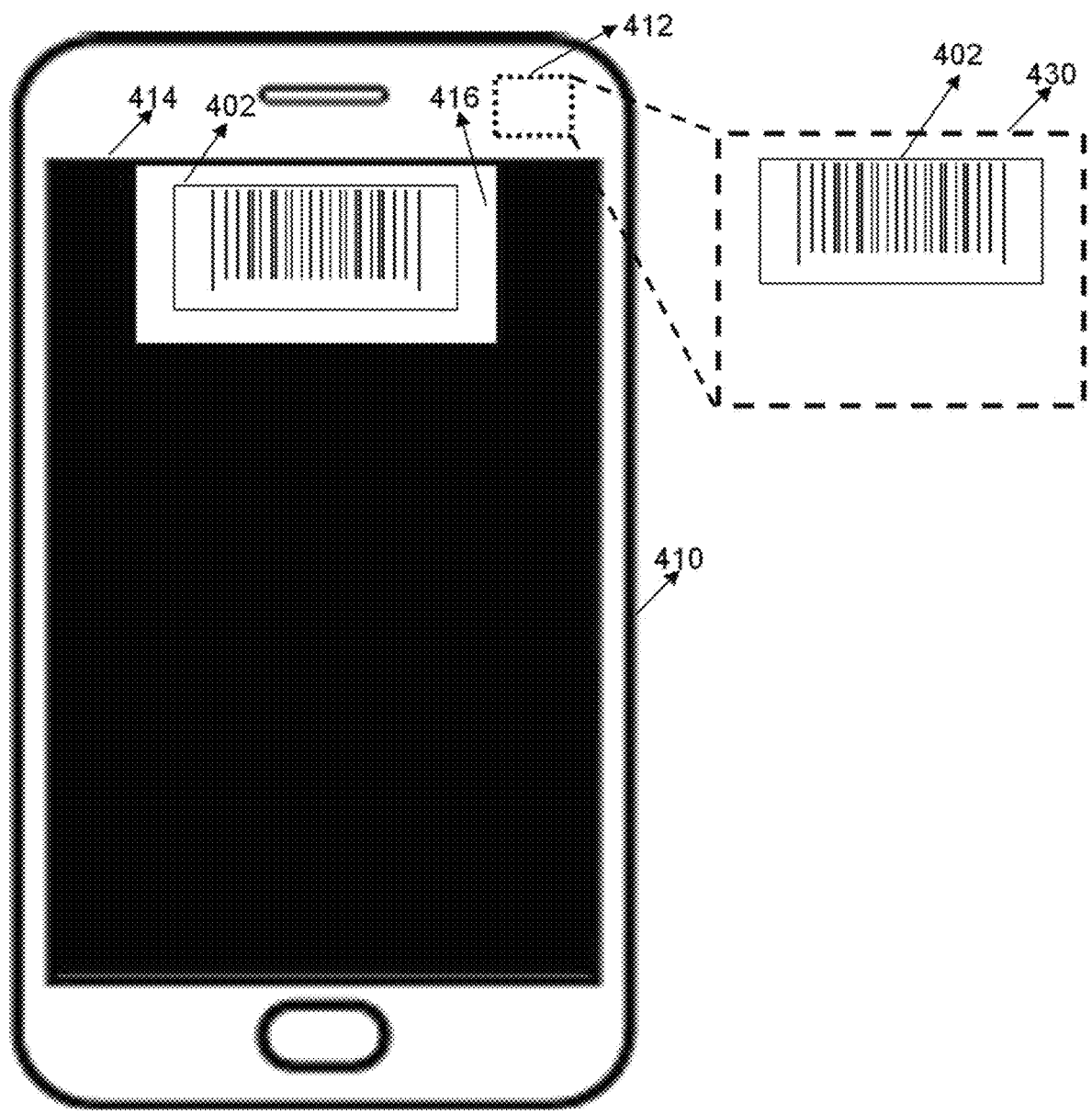

At step 400-3 shown in FIG. 4C, the user has focused the camera 412 onto the barcode 402. As shown in FIG. 4C, the camera view 430 of the camera 412 starts to include an entirety of the barcode 402. That is, as the camera 412 captures a video including a series of frame images to scan barcode, the video starts to include an entirety of the barcode 402 in the frame image shown in the camera view 430 of FIG. 4C. At this point, the mobile device 410 can detect the entirety of the barcode 402 in the camera view 430. Accordingly, the display 414 of the mobile device 410 starts to present the viewable area 416 with full or normal brightness level (not dimmed). The remaining area other than the viewable area 416 in the display 414 is deactivated and does not present anything.

As discussed above, various parameters of the viewable area 416, e.g. size, dimension, location, dimming level, margin space outside the barcode 402, etc., can be determined and dynamically adjusted by the mobile device 410, according to a machine learning model or an AI model generated by the mobile device 410 itself or the display computing device 102, based on parameters of the barcode 402 in the camera view 430, e.g. size, dimension, and/or location of the barcode 402 in the camera view 430. In a comparison between the viewable area 416 in FIG. 4C and the viewable area 416 in FIG. 4B, both of them are located at the top of the display 414, but the former has a larger size and dimension, a higher brightness level, and a larger margin space outside the barcode 402. In some embodiments, this is because the camera view 430 in FIG. 4C has included the entirety of the barcode 402. In some embodiments, as the process goes from the step 400-1 to the step 400-2 and then to the step 400-3, the brightness level of the viewable area 416 gradually increases from totally black to a normal non-dimmed brightness level as shown in FIG. 4C.

Figure 4D:
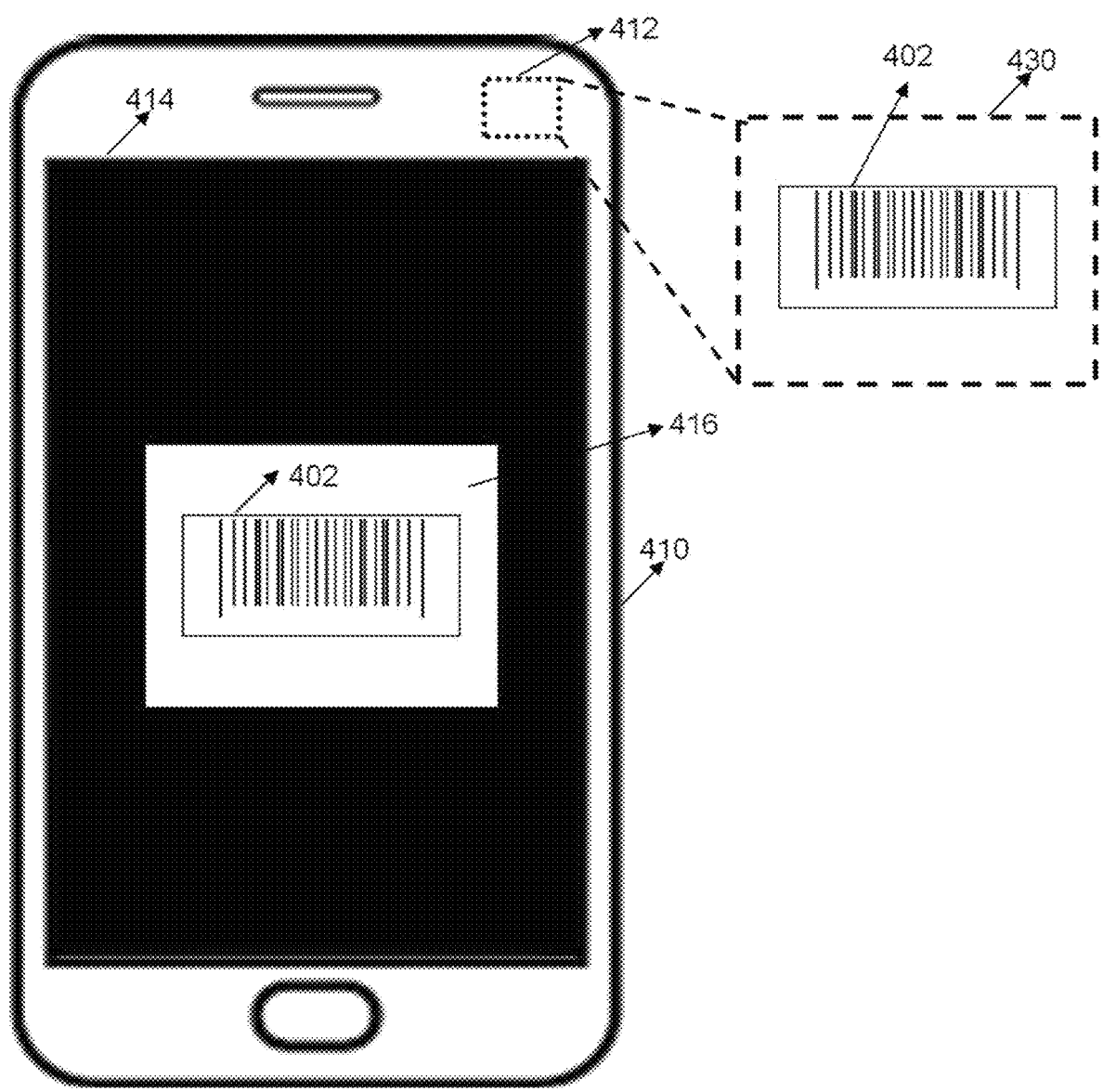

At step 400-4 shown in FIG. 4D, the camera view 430 of the camera 412 has an entirety of the barcode 402 placed at or around the center of the camera view 430. That is, as the camera 412 captures a video including a series of frame images to scan barcode, the video starts to include an entirety of the barcode 402 at or around the center of the frame image shown in the camera view 430 of FIG. 4C. At this point, the mobile device 410 can detect the entirety of the barcode 402 in the camera view 430. Accordingly, the display 414 of the mobile device 410 presents the viewable area 416 with non-dimmed brightness level at the center of the display 414 and start to decode the barcode 402 in the viewable area 416. The camera 412 stops scanning at the step 400-4.

In some embodiments, the mobile device 410 can start to decode the barcode 402 in the viewable area 416 and instruct the camera 412 to stop scanning, at any time between the step 400-3 and the step 400-4. That is, the mobile device 410 does not need to wait for the entirety of the barcode 402 placed at or around the center of the camera view 430, to start decoding the barcode 402. In some embodiments, the mobile device 410 can start to decode the barcode 402 in the viewable area 416 even before the entirety of the barcode 402 is shown in the camera view 430.

As discussed above, various parameters of the viewable area 416, e.g. size, dimension, location, dimming level, margin space outside the barcode 402, etc., can be determined and dynamically adjusted by the mobile device 410, according to a machine learning model or an AI model generated by the mobile device 410 itself or the display computing device 102, based on parameters of the barcode 402 in the camera view 430, e.g. size, dimension, and/or location of the barcode 402 in the camera view 430. In a comparison between the viewable area 416 in FIG. 4D and the viewable area 416 in FIG. 4C, both of them have the same brightness level, but the former has a larger size and dimension, a larger margin space outside the barcode 402. While the viewable area 416 in FIG. 4C is located at the top of the display 414, the viewable area 416 in FIG. 4D is located at the center of the display 414. In some embodiments, this is because the camera view 430 in FIG. 4C has included the entirety of the barcode 402 at or around the center of the camera view 430, or because the mobile device 410 has started decoding the barcode 402 and/or instructed the camera 412 to stop scanning.

In some embodiments, a frame rate of the camera 412 is dynamically adjusted during the process 400. For example, at the step 400-1, the frame rate is set to be lower than a predetermined threshold (e.g. 5 frames per second), since there is no barcode detected yet. Then, at the step 400-2, the frame rate is gradually increased to be higher than a predetermined threshold (e.g. 40 or 50 frames per second), since a portion of the barcode starts to show up. The frame rate is back to a normal value, e.g. 60 frames per second, by the step 400-3, where an entirety of the barcode is detected. This is also helpful to reduce energy consumption and extend battery life.

Figure 5A:
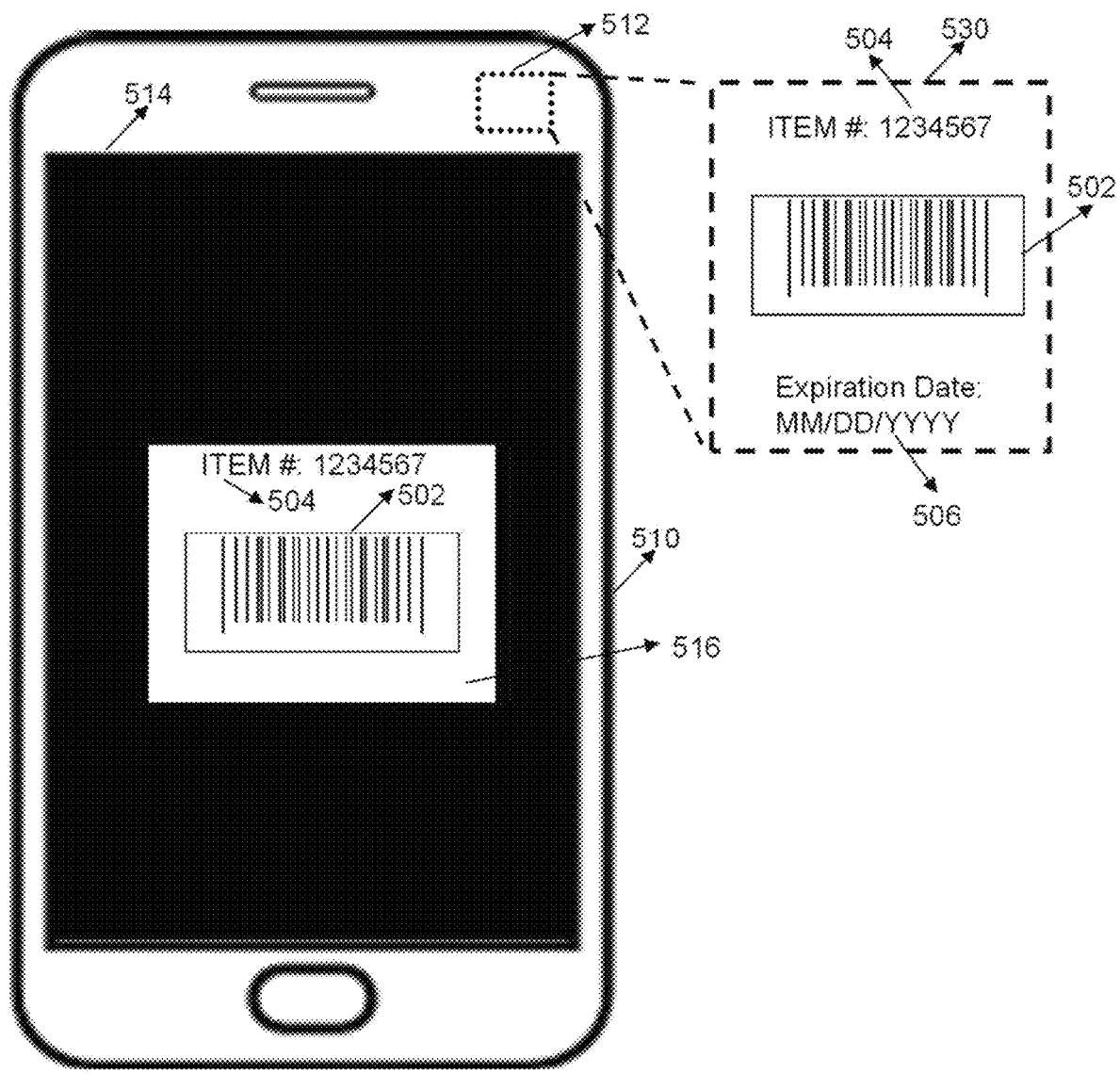
FIGS. 5A-5C illustrate examples for displaying a barcode during barcode scanning, in accordance with some embodiments of the present teaching.
Figure 5B:
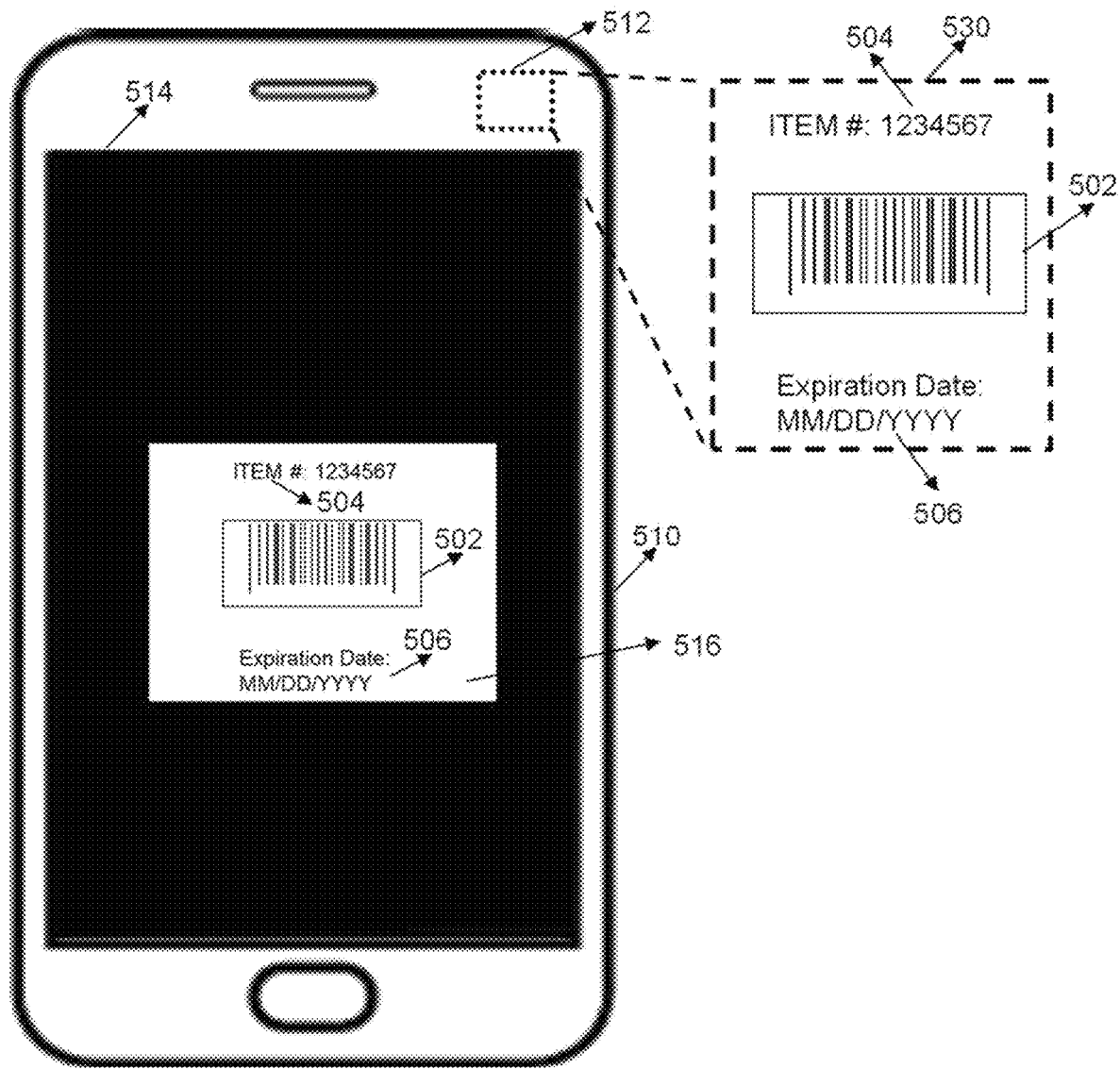
Figure 5C:
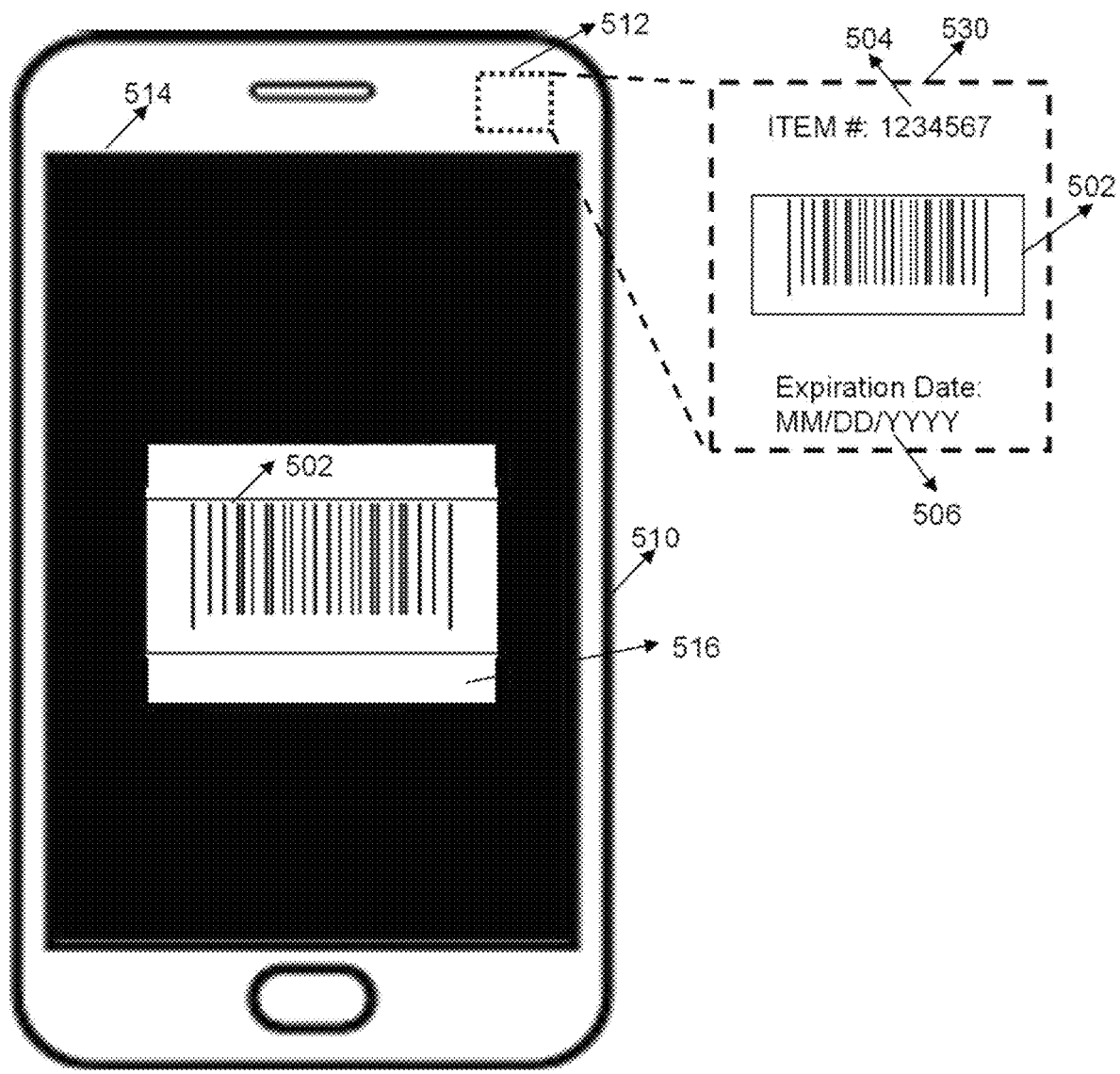

FIGS. 5A-5C illustrate examples 500-1, 500-2, 500-3 for displaying a barcode during barcode scanning, in accordance with some embodiments of the present teaching. In some embodiments, each of the examples 500-1, 500-2, 500-3 is performed by a mobile device 510, which may be implemented as any one of the code scanning devices 110, 112, 114 in FIG. 1, the scanning device 310 in FIG. 3, or the mobile device 410 in FIGS. 4A-4D.

In the example 500-1 shown in FIG. 5A, the mobile device 510 is running a code scanning app, with a camera 512 activated for scanning a barcode 502 of an item in a camera view 530, e.g. after the user selects a code scanning function. As shown in FIG. 5A, the camera view 530 of the camera 512 includes: an entirety of the barcode 502, an item number 504 above the barcode 502, and an expiration date 506 below the barcode 502. That is, as the camera 512 scans the barcode 502, the camera 512 captures other information on the item at the same time.

In the example 500-1 shown in FIG. 5A, the mobile device 510 detects an entirety of the barcode 502 in the camera view 530. Accordingly, the mobile device 510 instructs a display 514 to present a viewable area 516 with non-dimmed brightness level at the center of the display 514 and starts to decode the barcode 502 in the viewable area 516. In this example, the remaining area other than the viewable area 516 in the display 514 is deactivated and does not present anything. In some embodiments, the camera 512 stops scanning.

Various parameters of the viewable area 516, e.g. size, dimension, location, dimming level, margin space outside the barcode 502, etc., can be determined and/or dynamically adjusted by the mobile device 510, according to a machine learning model or an AI model generated by the mobile device 510 itself or the display computing device 102. In the example 500-1 shown in FIG. 5A, the size of the viewable area 516 is predetermined before the code scanning; and the dimensions of the barcode 502 and other content presented in the viewable area 516 are the same as those captured in the camera view 530, given a zooming setup of the camera 512. As such, in this case, whatever captured in the camera view 530 is trimmed to fit the size of the viewable area 516. It is up to the user to focus the camera view 530 on the barcode 502 and move the camera 512 to fit the barcode 502 into the viewable area 516. In the example 500-1 shown in FIG. 5A, the viewable area 516 presents the item number 504 and the barcode 502, with the expiration date 506 cut off from the camera view 530.

In the example 500-2 shown in FIG. 5B, the mobile device 510 is running the code scanning app, with the camera 512 activated for scanning the barcode 502 in the camera view 530, which includes: the entirety of the barcode 502, the item number 504 above the barcode 502, and the expiration date 506 below the barcode 502. Similar to the example 500-1 shown in FIG. 5A, the mobile device 510 detects the entirety of the barcode 502 in the camera view 530, instructs the display 514 to present a viewable area 516 with non-dimmed brightness level at the center of the display 514 and starts to decode the barcode 502 in the viewable area 516. The remaining area other than the viewable area 516 in the display 514 is deactivated and does not present anything. Various parameters of the viewable area 516 in FIG. 5B, e.g. size, dimension, location, dimming level, margin space outside the barcode 502, etc., can be determined and/or dynamically adjusted by the mobile device 510, according to a machine learning model or an AI model generated by the mobile device 510 itself or the display computing device 102.

In the example 500-2 shown in FIG. 5B, the size of the viewable area 516 is predetermined before the code scanning. But different from the example 500-1 shown in FIG. 5A, the dimensions of the barcode 502 and other content presented in the viewable area 516 in FIG. 5B are not necessarily the same as those captured in the camera view 530, regardless of the zooming setup of the camera 512. In the example 500-2 shown in FIG. 5B, an entirety of the camera view 530 is reduced (or enlarged if needed) to fit the size of the viewable area 516. As shown in FIG. 5B, the viewable area 516 presents all of the item number 504, the barcode 502 and the expiration date 506 from the camera view 530, with the size of the viewable area 516 being substantially smaller than the size of the display 514, to save energy and improve battery life.

In the example 500-3 shown in FIG. 5C, the mobile device 510 is running the code scanning app, with the camera 512 activated for scanning the barcode 502 in the camera view 530, which includes: the entirety of the barcode 502, the item number 504 above the barcode 502, and the expiration date 506 below the barcode 502. Similar to the example 500-1 shown in FIG. 5A, the mobile device 510 detects the entirety of the barcode 502 in the camera view 530, instructs the display 514 to present a viewable area 516 with non-dimmed brightness level at the center of the display 514 and starts to decode the barcode 502 in the viewable area 516. The remaining area other than the viewable area 516 in the display 514 is deactivated and does not present anything. Various parameters of the viewable area 516 in FIG. 5B, e.g. size, dimension, location, dimming level, margin space outside the barcode 502, etc., can be determined and/or dynamically adjusted by the mobile device 510, according to a machine learning model or an AI model generated by the mobile device 510 itself or the display computing device 102.

In the example 500-3 shown in FIG. 5C, the size of the viewable area 516 is predetermined before the code scanning. But different from the example 500-1 shown in FIG. 5A, the dimensions of the barcode 502 and other content presented in the viewable area 516 in FIG. 5B are not necessarily the same as those captured in the camera view 530, regardless of the zooming setup of the camera 512. In the example 500-3 shown in FIG. 5C, an entirety of the barcode 502 from the camera view 530 is enlarged (or reduced if needed) to fit the size of the viewable area 516. As shown in FIG. 5C, the viewable area 516 presents the entirety of the barcode 502, with the item number 504 and the expiration date 506 cut off from the camera view 530.

Figure 6:
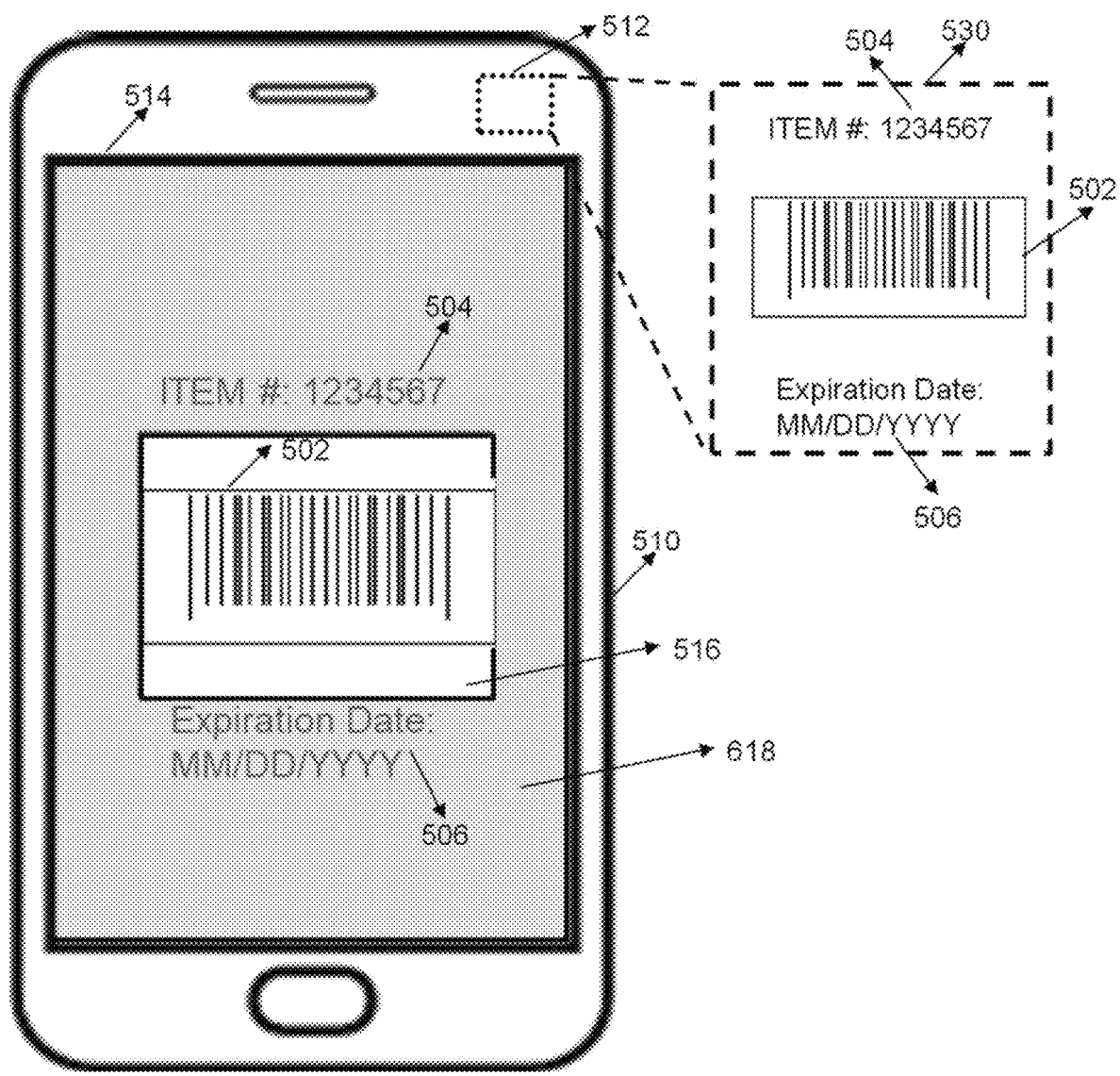
FIG. 6 illustrates an additional example for displaying a barcode during barcode scanning, in accordance with some embodiments of the present teaching.

FIG. 6 illustrates an additional example 600 for displaying a barcode during barcode scanning, in accordance with some embodiments of the present teaching. In some embodiments, the example 600 is performed by the mobile device 510, which may be implemented as any one of the code scanning devices 110, 112, 114 in FIG. 1, the scanning device 310 in FIG. 3, the mobile device 410 in FIGS. 4A-4D, or the mobile device 510 in FIGS. 5A-5C.

The example 600 shown in FIG. 6 is similar to the example 500-3 in FIG. 5C, in that an entirety of the barcode 502 from the camera view 530 is enlarged (or reduced if needed) to fit the size of the viewable area 516. But different from the example 500-3 in FIG. 5C, the remaining area 618 other than the viewable area 516 in the display 514 in FIG. 6 is dimmed rather than being totally deactivated. As shown in FIG. 6, while the viewable area 516 presents the entirety of the barcode 502, the remaining area 618 shows the item number 504 and the expiration date 506 (enlarged accordingly from the camera view 530) in dimmed version. That is, an entirety of the camera view 530 is enlarged (or reduced if needed) to make the barcode 502 fit the size of the viewable area 516. After the enlarging, if the other content in the camera view 530 cannot fit into the viewable area 516, it is presented in the remaining area 618 accordingly with a lower brightness level than the viewable area 516.

In some embodiments, the brightness level of the remaining area 618 is lower than that of the viewable area 516 by a predetermined percentage, e.g. 50%, 70%, 90%, etc. . . . In some embodiments, the brightness level of the remaining area 618 can be determined and/or dynamically adjusted by the mobile device 510, according to a machine learning model or an AI model generated by the mobile device 510 itself or the display computing device 102. Although the dimmed presentation of the remaining area 618 in FIG. 6 is applied based on the example 500-3 in FIG. 5C, it can be understood that similar dimmed presentation of the remaining area 618 in FIG. 6 can be combined with other examples, e.g. the example 500-1 in FIG. 5A, the example 500-2 in FIG. 5B and/or the steps in FIGS. 4A-4D.

Figure 7A:
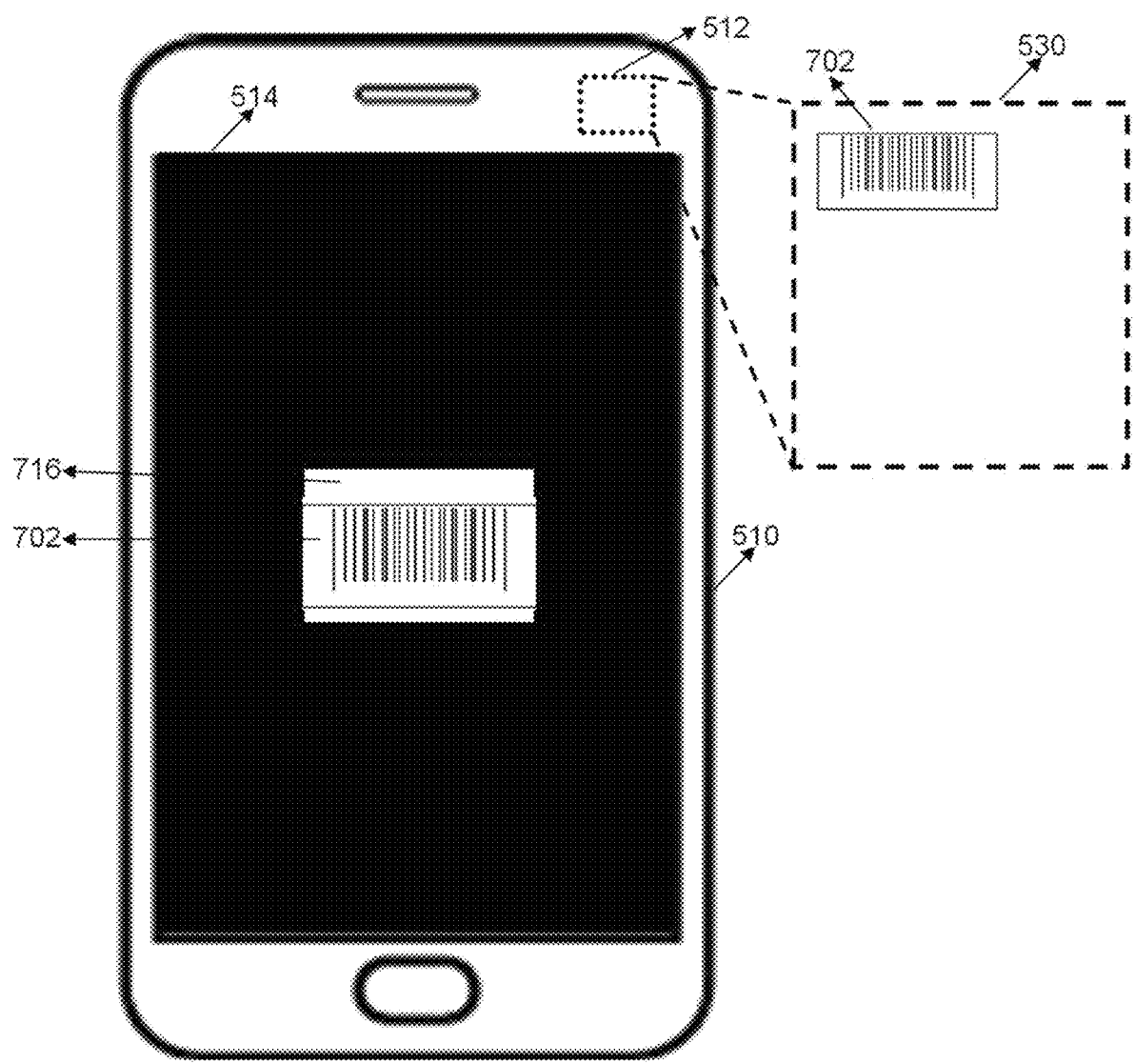
FIGS. 7A-7B illustrate examples for dynamically adjusting a size of a viewable area during barcode scanning, in accordance with some embodiments of the present teaching.
Figure 7B:
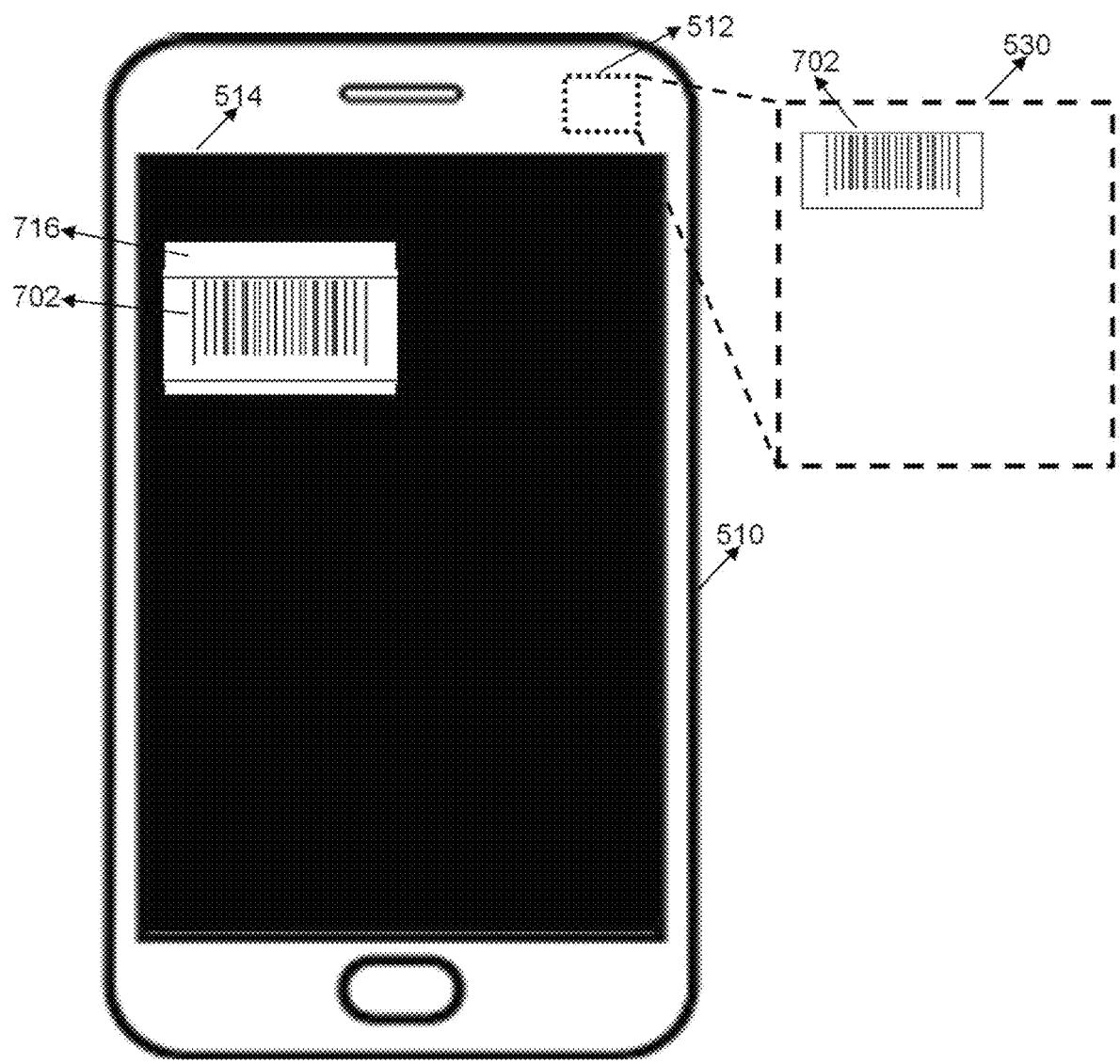

FIGS. 7A-7B illustrate examples 700-1, 700-2 for dynamically adjusting a size of a viewable area during barcode scanning, in accordance with some embodiments of the present teaching. In some embodiments, each of the examples 700-1, 700-2 is performed by the mobile device 510, which may be implemented as any one of the code scanning devices 110, 112, 114 in FIG. 1, the scanning device 310 in FIG. 3, the mobile device 410 in FIGS. 4A-4D, or the mobile device 510 in FIGS. 5A-5C.

In the example 700-1 shown in FIG. 7A, the mobile device 510 is running a code scanning app, with a camera 512 activated for scanning a barcode 702 of an item in a camera view 530. As shown in FIG. 7A, the camera view 530 of the camera 512 includes an entirety of the barcode 702 located at an upper left corner of the camera view 530. In the example 700-1 shown in FIG. 7A, the mobile device 510 detects the entirety of the barcode 702 in the camera view 530. Accordingly, the mobile device 510 instructs a display 514 to present a viewable area 716 with non-dimmed brightness level at the center of the display 514 and starts to decode the barcode 702 in the viewable area 716. In this example, the remaining area other than the viewable area 716 in the display 514 is deactivated and does not present anything. In other embodiments, the remaining area other than the viewable area 716 in the display 514 may give a dimmed presentation as the remaining area 618 in FIG. 6.

Various parameters of the viewable area 716, e.g. size, dimension, location, dimming level, margin space outside the barcode 702, etc., can be determined and/or dynamically adjusted by the mobile device 510, according to a machine learning model or an AI model generated by the mobile device 510 itself or the display computing device 102. During the code scanning, the size and location of the barcode 702 in the camera view 530 may be changed due to a zooming setup change, or a movement of the camera 512 closer or farther from the barcode 702 on the item. In the example 700-1 shown in FIG. 7A, the size of the viewable area 716 is dynamically adjusted based on the size of the barcode 702 in the camera view 530, while the location of the viewable area 716 is kept in the center of the display 514.

In comparison of the example 700-1 shown in FIG. 7A and the example 500-3 shown in FIG. 5C, the former has a smaller barcode in the camera view 530, and as such a smaller size of the viewable area 716 (not just a smaller size of the barcode in the viewable area 716). That is, in the example 700-1 shown in FIG. 7A, the dimensions of the barcode 702 in the viewable area 716 are the same as those of the barcode 702 in the camera view 530, and the size of the viewable area 716 is dynamically adjusted to fit the barcode 702 from the camera view 530, as the user zooms in or out at the camera 512, or moves closer or farther of the camera 512 from the scanned item.

In the example 700-2 shown in FIG. 7B, the mobile device 510 is running a code scanning app, with a camera 512 activated for scanning a barcode 702 of an item in a camera view 530. Similar to the example 700-1 shown in FIG. 7A, the camera view 530 of the camera 512 includes an entirety of the barcode 702 located at an upper left corner of the camera view 530, and the mobile device 510 detects the entirety of the barcode 702 in the camera view 530 and instructs a display 514 to present a viewable area 716 with non-dimmed brightness level in the display 514 and starts to decode the barcode 702 in the viewable area 716. In this example, the remaining area other than the viewable area 716 in the display 514 is deactivated and does not present anything. In other embodiments, the remaining area other than the viewable area 716 in the display 514 may give a dimmed presentation as the remaining area 618 in FIG. 6.

Various parameters of the viewable area 716, e.g. size, dimension, location, dimming level, margin space outside the barcode 702, etc., can be determined and/or dynamically adjusted by the mobile device 510, according to a machine learning model or an AI model generated by the mobile device 510 itself or the display computing device 102. During the code scanning, the size and location of the barcode 702 in the camera view 530 may be changed due to a zooming setup change, or a movement of the camera 512 closer or farther from the barcode 702 on the item. Similar to the example 700-1 shown in FIG. 7A, the size of the viewable area 716 in FIG. 7B is dynamically adjusted based on the size of the barcode 702 in the camera view 530. But different from the example 700-1 shown in FIG. 7A, the location of the viewable area 716 in FIG. 7B is also dynamically changed in the display 514, e.g. based on the location of the barcode 702 in the camera view 530.

In the example 700-2 shown in FIG. 7B, the dimensions of the barcode 702 in the viewable area 716 are the same as those of the barcode 702 in the camera view 530, and the size of the viewable area 716 is dynamically adjusted to fit the barcode 702 from the camera view 530, as the user zooms in or out at the camera 512, or moves closer or farther of the camera 512 from the scanned item. In addition, the location of the viewable area 716 in FIG. 7B is also dynamically changed in the display 514 according to the location of the barcode 702 in the camera view 530. In the example 700-2 shown in FIG. 7B, a center of the camera view 530 aligns to a center of the display 514, such that when the barcode 702 is located at the upper left corner of the camera view 530, the viewable area 716 fitting the barcode 702 is located at the upper left corner of the display 514 accordingly. In contrast, in the example 700-1 shown in FIG. 7A, a center of the barcode 702 in the camera view 530 aligns to a center of the display 514, such that wherever the barcode 702 is located in the camera view 530, the viewable area 716 fitting the barcode 702 is always located at the center of the display 514. In can be understood that in some embodiments, the dynamic adjusting feature of the size and/or location of a viewable area in the example 700-1 shown in FIG. 7B and the example 700-2 shown in FIG. 7B can be combined with other examples, e.g. the example 500-1 in FIG. 5A, the example 500-2 in FIG. 5B, the example 600 in FIG. 6, and/or the steps in FIGS. 4A-4D.

In some embodiments, in any of the examples described above and performed by any of the code scanning devices 110, 112, 114 in FIG. 1, the scanning device 310 in FIG. 3, the mobile device 410 in FIGS. 4A-4D, or the mobile device 510 in FIGS. 5-7, camera parameters can be dynamically adjusted during the barcode scanning, especially when the code scanning device has multiple cameras. For example, the camera parameters may include but not limited to: cutting factor of a camera view, viewing angle of the camera, brightness, color level, frame rate, etc. When the code scanning device has multiple cameras, the app can activate a pre-trained machine learning model to determine which camera to choose for code scanning, e.g. whether a wide angel camera or a regular camera. In some embodiments, the app running on one mobile device provides different options for barcode scanning, corresponding to the different examples shown in FIGS. 3-7. In some embodiments, the user chooses one of the provided options for code scanning. In some embodiments, the app activates a pre-trained machine learning model to choose one of the provided options for code scanning, based on the user's historical behavior, and/or the real-time images captured by the camera.

Figure 8:
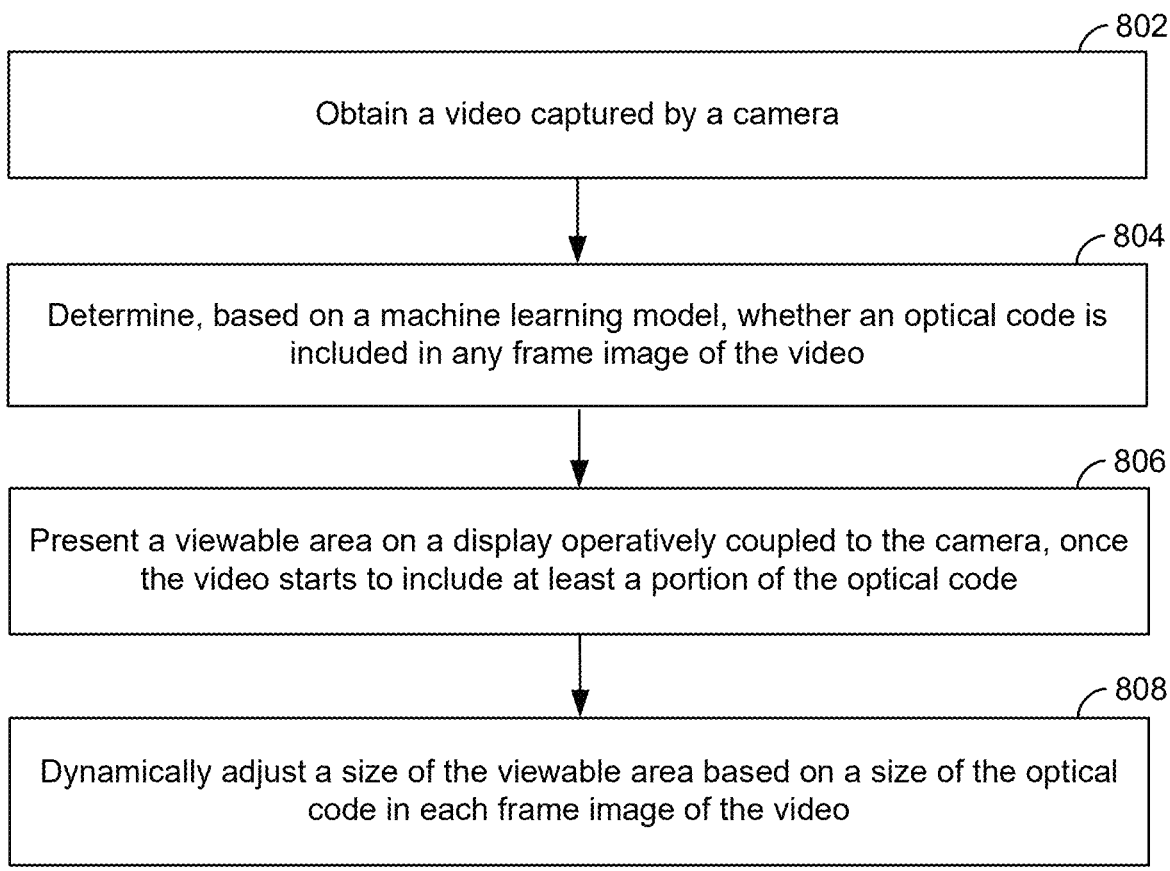
FIG. 8 is a flowchart illustrating an example method for optical code scanning with improved energy efficiency, in accordance with some embodiments of the present teaching.

FIG. 8 is a flowchart illustrating an example method 800 for optical code scanning with improved energy efficiency, in accordance with some embodiments of the present teaching. In some embodiments, the method 800 can be carried out by one or more computing devices, such as the code scanning devices 110, 112, 114 of FIG. 1. Beginning at operation 802, a video is captured by a camera of a code scanning device. Based on a machine learning model, it is determined at operation 804 whether an optical code is included in any frame image of the video. At operation 806, a viewable area is presented on a display operatively coupled to the camera, once the video starts to include at least a portion of the optical code. At operation 808, a size of the viewable area is dynamically adjusted based on a size of the optical code in each frame image of the video.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of example embodiments, it is not limited thereto. Rather, the appended claims should be construed broadly, to include other variants and embodiments, which can be made by those skilled in the art.

What is claimed is:

1. A system for optical code scanning, comprising:
a camera;
a display operatively coupled to the camera;
a processor operatively coupled to the camera and the display; and
a non-transitory memory storing instructions, that when executed, cause the processor to:
obtain a video captured by the camera,
determine, based on a machine learning model, whether an optical code is included in any frame image of the video,
present a viewable area on the display once the video starts to include at least a portion of the optical code, wherein all pixels outside the viewable area on the display are dimmed, deactivated, or disabled, and
dynamically adjust the viewable area based on a size of the optical code in each frame image of the video.

2. The system of claim 1, wherein:
a size of the viewable area is dynamically adjusted based on the size of the optical code in each frame image and a location of the optical code in each frame image.

3. The system of claim 1, wherein:
a size of the viewable area is dynamically reduced or enlarged to fit the size of the optical code in the video, after an entirety of the optical code is detected in a current frame image of the video.

4. The system of claim 1, wherein the instructions, when executed, further cause the processor to:
turn off the viewable area on the display when no optical code is detected in a current frame image of the video.

5. The system of claim 1, wherein:
the viewable area has a reduced size compared to a screen of the display; and
an entire live view of the camera is adjusted to make the viewable area fit at least one of: the entire live view of the camera, a portion of the entire live view of the camera, or merely an entirety of the optical code in the entire live view of the camera.

6. The system of claim 1, wherein the instructions, when executed, further cause the processor to:
run a code scanning app which activates the camera for scanning a first optical code on an item, wherein:
the first optical code is a barcode or a quick-response (QR) code, and
the first optical code identifies a payment method, a user account, or other information related to the item in a retail or inventory management environment.

7. The system of claim 6, wherein the viewable area is dynamically adjusted such that:
the viewable area has a brightness level lower than a predetermined threshold when a portion of the optical code is included in a current frame image of the video;
as the portion of the optical code increases in a current frame image of the video, the brightness level of the viewable area gradually increases from a black brightness level to the predetermined threshold, and a size of the viewable area gradually increases to fit the portion of the optical code; and
the brightness level of the viewable area reaches the predetermined threshold when an entirety of the optical code is included in a current frame image of the video.

8. The system of claim 7, wherein the instructions, when executed, further cause the processor to:
place the viewable area at a top side of the display when the portion of the optical code is included in a current frame image of the video;
decode the optical code in the viewable area before the entirety of the optical code is included in a current frame image of the video;
place the viewable area at a center of the display after the entirety of the optical code is included in a current frame image of the video; and
stop scanning the optical code after the entirety of the optical code is included in a current frame image of the video.

9. The system of claim 1, wherein the instructions, when executed, further cause the processor to dynamically adjust a frame rate of the camera such that:

the frame rate of the camera is lower than a predetermined threshold when a portion of the optical code is included in a current frame image of the video;

the frame rate of the camera gradually increases as more of the optical code is moved into a current frame image of the video than a previous frame image of the video; and the frame rate of the camera reaches predetermined threshold when an entirety of the optical code is included in a current frame image of the video.

10. A computer-implemented method, comprising:

obtaining a video captured by a camera;

determining, based on a machine learning model, whether an optical code is included in any frame image of the video;

presenting a viewable area on a display operatively coupled to the camera, once the video starts to include at least a portion of the optical code, wherein all pixels outside the viewable area on the display are dimmed, deactivated, or disabled; and dynamically adjusting the viewable area based on a size of the optical code in each frame image of the video.

11. The computer-implemented method of claim 10, further comprising:

turning off the viewable area on the display when no optical code is detected in a current frame image of the video.

12. The computer-implemented method of claim 10, wherein:

a size of the viewable area is dynamically adjusted based on the size of the optical code in each frame image and a location of the optical code in each frame image; and the size of the viewable area is dynamically reduced or enlarged to fit the size of the optical code in the video, after an entirety of the optical code is detected in a current frame image of the video.

13. The computer-implemented method of claim 10, wherein:

the viewable area has a reduced size compared to a screen of the display; and an entire live view of the camera is adjusted to make the viewable area fit at least one of: the entire live view of the camera, a portion of the entire live view of the camera, or merely an entirety of the optical code in the entire live view of the camera.

14. The computer-implemented method of claim 10, further comprising:

running a code scanning app which activates the camera for scanning a first optical code on an item, wherein:
the first optical code is a barcode or a quick-response (QR) code, and
the first optical code identifies a payment method, a user account, or other information related to the item in a retail or inventory management environment.

15. The computer-implemented method of claim 14, wherein the viewable area is dynamically adjusted such that:

the viewable area has a brightness level lower than a predetermined threshold when a portion of the optical code is included in a current frame image of the video;

as the portion of the optical code increases in a current frame image of the video, the brightness level of the viewable area gradually increases from a black brightness level to the predetermined threshold, and a size of the viewable area gradually increases to fit the portion of the optical code; and the brightness level of the viewable area reaches the predetermined threshold when an entirety of the optical code is included in a current frame image of the video.

16. The computer-implemented method of claim 15, further comprising:

placing the viewable area at a top side of the display when the portion of the optical code is included in a current frame image of the video;

decoding the optical code in the viewable area before the entirety of the optical code is included in a current frame image of the video;

placing the viewable area at a center of the display after the entirety of the optical code is included in a current frame image of the video; and stopping scanning the optical code after the entirety of the optical code is included in a current frame image of the video.

17. The computer-implemented method of claim 10, further comprising dynamically adjusting a frame rate of the camera such that:

the frame rate of the camera is lower than a predetermined threshold when a portion of the optical code is included in a current frame image of the video;

the frame rate of the camera gradually increases as more of the optical code is moved into a current frame image of the video than a previous frame image of the video; and the frame rate of the camera reaches predetermined threshold when an entirety of the optical code is included in a current frame image of the video.

18. A non-transitory computer readable medium having instructions stored thereon, wherein the instructions, when executed by at least one processor, cause at least one device to perform operations comprising:

obtaining a video captured by a camera;

determining, based on a machine learning model, whether an optical code is included in any frame image of the video;

presenting a viewable area on a display operatively coupled to the camera, once the video starts to include at least a portion of the optical code, wherein all pixels outside the viewable area on the display are dimmed, deactivated, or disabled; and dynamically adjusting the viewable area based on a size of the optical code in each frame image of the video.

19. The computer readable medium of claim 18, wherein:

a size of the viewable area is dynamically adjusted based on the size of the optical code in each frame image and a location of the optical code in each frame image.

20. The computer readable medium of claim 18, wherein the instructions, when executed, further cause the at least one processor to:

run a code scanning app which activates the camera for scanning a first optical code on an item, wherein the first optical code is a barcode or a quick-response (QR) code, and the first optical code identifies a payment method, a user account, or other information related to the item in a retail or inventory management environment.

* * * * *